US009690111B2

(12) United States Patent
Plotkin

(10) Patent No.: US 9,690,111 B2
(45) Date of Patent: Jun. 27, 2017

(54) COLLAPSIBLE STEREOSCOPIC VIEWER

(75) Inventor: Jeffrey David Plotkin, Simi Valley, CA (US)

(73) Assignee: Not Flat Photos, LLC, Canoga Park, CA (US)

( * ) Notice: Subject to any disclaimer, the term of this patent is extended or adjusted under 35 U.S.C. 154(b) by 520 days.

(21) Appl. No.: 13/541,309

(22) Filed: Jul. 3, 2012

(65) Prior Publication Data

US 2014/0009828 A1    Jan. 9, 2014

(51) Int. Cl.
G02B 27/22    (2006.01)

(52) U.S. Cl.
CPC ..... *G02B 27/2257* (2013.01); *G02B 27/2228* (2013.01)

(58) Field of Classification Search
None
See application file for complete search history.

(56) References Cited

U.S. PATENT DOCUMENTS

| 712,410 | A | | 10/1902 | Reichenbach |
| 962,643 | A | | 6/1910 | Knopping |
| 1,097,601 | A | | 5/1914 | Maerz |
| 2,018,739 | A | | 10/1935 | Pauchek |
| 2,036,542 | A | * | 4/1936 | Rosenthal ............... 229/175 |
| 2,131,444 | A | * | 9/1938 | Bernhard et al. .......... 359/474 |
| 2,283,777 | A | | 5/1942 | Wendling |
| 2,368,480 | A | | 1/1945 | McClure |
| 2,616,333 | A | | 11/1952 | Tinker |
| 2,662,442 | A | | 12/1953 | Gowland |
| 2,821,884 | A | | 8/1955 | Austin |
| 2,757,573 | A | | 8/1956 | Turner |
| 2,789,460 | A | | 4/1957 | Kaufman |
| 2,984,153 | A | | 5/1961 | Brennan |
| 3,734,596 | A | | 5/1973 | Nerlich |
| 4,846,553 | A | | 7/1989 | Rice |

(Continued)

FOREIGN PATENT DOCUMENTS

| GB | 650221 A | * | 2/1951 | ........... B65D 5/3642 |
| GB | 001272266 A | * | 4/1972 | ............ G02B 27/04 |
| JP | 2002139806 A | * | 5/2002 | ............ G03B 36/18 |

OTHER PUBLICATIONS

International Search Report and Written Opinion of the International Searching Authority for the equivalent application.

*Primary Examiner* — Jade R Chwasz
*Assistant Examiner* — Jyotsna Dabbi
(74) *Attorney, Agent, or Firm* — Trojan Law Offices

(57) ABSTRACT

A collapsible stereoscope made of a stiff but bendable material. The stereoscope includes a front viewing panel with apertures for lenses, a rear picture holding panel, and bracing side walls, all integrally hinged to a bottom panel. Each bracing side wall varies in height so that it is tall enough in some regions to provide structural support, but short enough in other regions to reduce or prevent the casting of shadows on the stereogram. The length of each bracing side wall is longer than length of the bottom panel, so that when each bracing side wall is secured to the front panel, the bracing side walls bend in toward each other at a preformed folding crease which improves structural stability of the stereoscope, holds stereograms against the picture holding panel, and reduces shadowing on the stereogram. The collapsible stereoscope can be used as a greeting card.

16 Claims, 8 Drawing Sheets

(56) References Cited

U.S. PATENT DOCUMENTS

| | | | |
|---|---|---|---|
| 5,002,363 A | | 3/1991 | Tanaka |
| 5,309,281 A | | 5/1994 | Rover |
| 6,069,735 A | * | 5/2000 | Murphy .................... 359/408 |
| 6,151,165 A | | 11/2000 | Tomita |
| 2012/0026298 A1 | | 2/2012 | Filo |

* cited by examiner

COLLAPSIBLE STEREOSCOPIC VIEWER

FIELD OF THE INVENTION

This invention relates to stereoscopic viewers for viewing three-dimensional images. In particular, this invention relates to a collapsible stereoscope for viewing two adjacent two-dimensional images as a single three-dimensional image.

BACKGROUND OF THE INVENTION

The present invention is directed to overcoming problems associated with collapsible three-dimensional viewers called stereoscopes. Three-dimensional viewing of photographs generally is achieved by having an observer view one image with the left eye, and another similar image with the right eye. These two images are different views of the same object(s) and are placed adjacent to each other forming what is called a stereogram. Often times, the two images on the stereogram are photographs of an object taken by a camera from two slightly different angles. When the left eye sees the left image and the right eyes sees the right image on the stereogram, the observer's brain interprets the two different images as a single composite image that appears three-dimensional. Collapsible stereoscopes come in various sizes and shapes and are useful in that they are light weight, portable, and can be mailed in thin envelopes.

Many collapsible stereoscopes are box shaped, and constructed from a single cardboard blank having flaps, wings, or protruding edges that can be configured together to form an assembled stereoscope. It is important that when the stereoscope is assembled, it remains in a fairly rigid formation because the distance from the stereogram to the observer's eyes is critical for the brain to interpret two two-dimensional images as a single three-dimensional image. Creating a stereoscope that is both easily collapsible but also rigid enough to keep images in a stable location when assembled has been difficult. It has also been a challenge to make collapsible stereoscopes that have enough light to illuminate the stereogram, but also reduce or prevent shadowing on the stereogram caused by light that enters from the side of the stereoscope. Furthermore, it has been difficult to create a stereoscope having an easy assembly but also has the capability of easily interchanging stereograms inside of the stereoscope.

There are several types of collapsible stereoscopes with different features. Some stereoscopes lack the structural support of having side walls, including: U.S. Pat. No. 712,410 to Reichenbach, U.S. Pat. No. 962,643 to Knopping, U.S. Pat. No. 2,018,739 to Pauchek, U.S. Pat. No. 1,097,601 to Maerz, U.S. Pat. No. 2,283,777 to Wendling, U.S. Pat. No. 2,757,573 to Turner, U.S. Pat. No. 2,984,153 to Brennan, and U.S. Pat. No. 5,002,363 to Tanaka. Other stereoscopes are formed from several separate pieces of unconnected material that must be joined together, or have no mechanism that keeps the stereogram in place, including: U.S. Pat. No. 2,368,480 to McClure, U.S. Pat. No. 5,309,281 to Rover, and U.S. Pat. No. 6,151,165 to Tomita. Other stereoscopes have side wall supports but would likely cause shadowing on the stereogram, or exclude outside light altogether, such as U.S. Pat. No. 2,616,333 to Tinker, U.S. Pat. No. 2,662,442 to Gowland, U.S. Pat. No. 2,789,460 to Kaufman, U.S. Pat. No. 2,821,884 to Austin, and U.S. Pat. No. 6,069,735 to Murphy. Others, because of a closed-box assembled configuration, would make it difficult for the user to interchange stereograms in the stereoscope, such as the one described in U.S. Pat. No. 3,734,596 to Nerlich.

Therefore, there is a need for improved collapsible stereoscopes that are sturdy, easy to assemble, brace the stereogram, and reduce or prevent shadowing on the stereogram.

SUMMARY OF THE INVENTION

In view of the foregoing, the present invention is directed to a collapsible but sturdy stereoscope made from a single piece of stiff but bendable material that allows for outside light to enter the stereoscope, but reduces shadowing on the stereogram. The collapsible stereoscope can be folded and inserted into an envelope and used as a greeting card for occasions such as a birthday, Christmas, Mother's Day, Father's Day, New Years, or a wedding anniversary. The stereoscope can be decorated on the outside or inside to match these and other occasions. The stereoscope can also have an integrated musical feature where the stereoscope can play music when the stereoscope is opened or assembled.

In the broadest sense, the stereoscope may be made of any material, such as paper, plastic, paperboard, cardboard, metal, and the like, or any suitable combination of the these materials. The stereoscope comprises a front viewing panel having apertures for receiving lenses, two lenses, a rear picture holding panel, two bracing side walls with a preformed crease for easy folding, and a bottom panel that is integrally hinged to the front viewing panel, rear picture holding panel and bracing side walls. Light enters the stereoscope from the top open section onto the stereogram.

In one embodiment, two complimentary images approximately 4 inches (101.6 mm) in height by 3 inches (76.2 mm) in width are adjacent to each other on a stereogram with dimensions of 4 inches in height by 6 inches (152.4 mm) in width (these dimensions are preferred because standard sized photographs are commonly printed on 4 by 6 inch photographic paper, and each one of the complimentary images would take up approximately half of the photographic paper). The stereogram is inserted into the stereoscope and placed against the rear picture holding panel, or in other embodiments, the rear picture holding panel may be an LCD display. Preferably, the rear picture holding panel of the stereoscope has a width of approximately 6 inches and a height of approximately 4 inches to accommodate the placement of the stereogram(s). In other embodiments, the stereoscope may be constructed to hold different sized stereograms, such as, but not limited to, 3-inch by 5-inch stereograms, 5-inch by 7-inch stereograms, 6-inch by 8-inch stereograms or 8-inch by 10-inch stereograms.

BRIEF DESCRIPTION OF THE DRAWINGS

The above and various other objects and advantages of the invention will be described and understood from the following description of the preferred embodiments of the invention, the same being illustrated in the accompanying drawings.

DETAILED DESCRIPTION OF THE INVENTION

Figure 1:
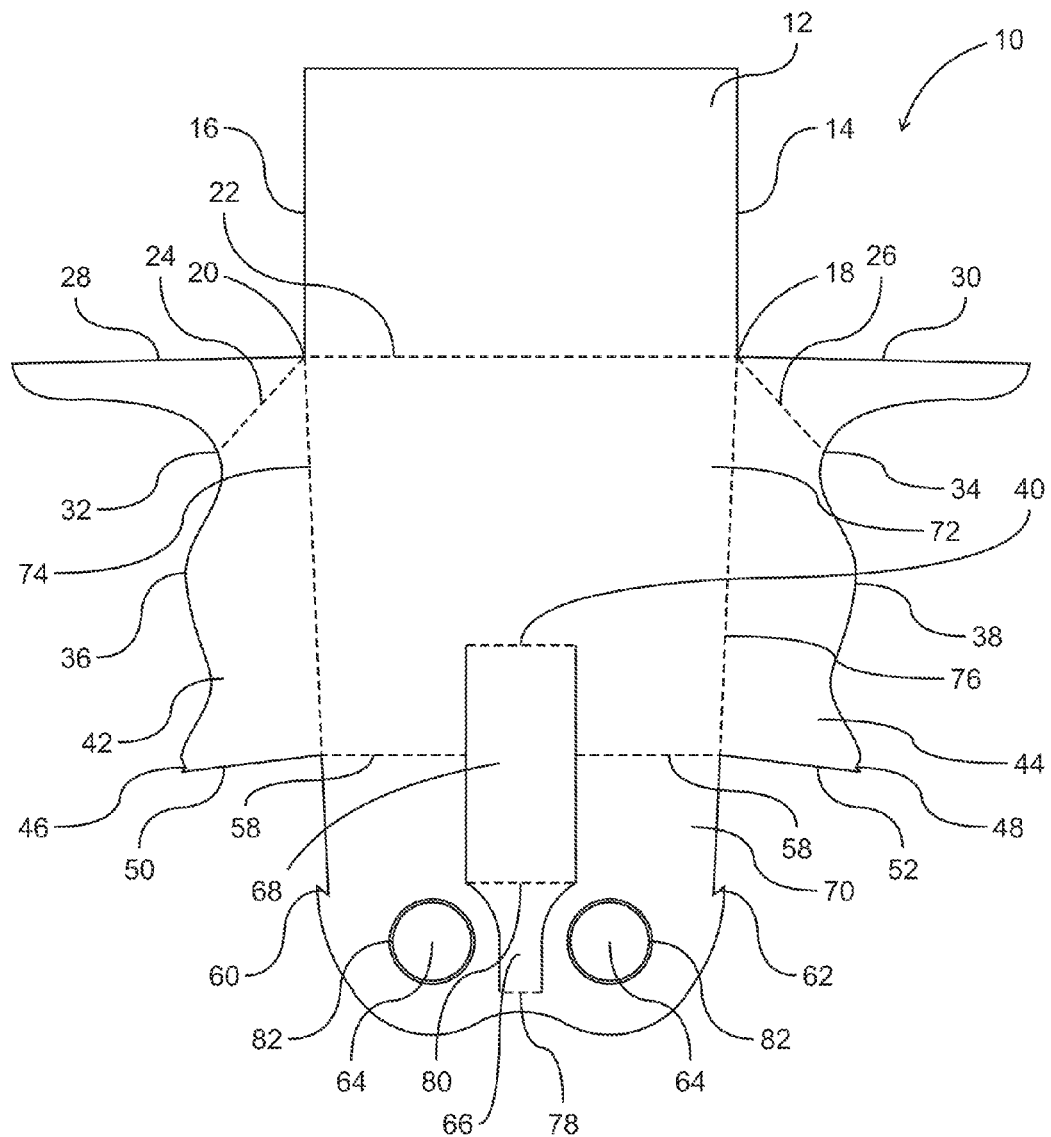
FIG. 1 is a plan view of an unfolded stereoscope.

The following description is of the best-contemplated mode of carrying out the invention. This description is made for the purpose of illustrating the general principles of the invention and should not be taken in a limiting sense. The scope of the invention is best determined by reference to the appended claims. Preferable embodiments of the present invention are described with reference to the FIGS. 1-8.

The bottom panel has a rear long edge integrally hinged to the base of the rear picture holding panel. Where a standard 4 by 6 inch stereogram is placed against the rear picture holding panel, this rear long edge of the bottom panel is also preferably approximately 6 inches. A front short edge of the bottom panel, shorter than the rear long edge of the bottom panel, is integrally hinged to a front viewing pane. In an embodiment where a standard 4 by 6 inch stereogram is placed against the rear picture holding panel, the front short edge of the bottom panel is preferably approximately 5.5 inches (139.7 mm), and parallel to the rear long edge of the bottom panel. Preferably, the sides of the bottom panel extend from the long rear edge to the short front edge, creating a trapezoidal shape of the bottom panel having a trapezoidal height of preferably approximately 5.5 inches. The trapezoidal shape of the bottom panel is defined by having two parallel bases (the rear long edge and front short edge) of different widths. In a stereoscope having these dimensions the distance from the stereogram on the rear picture holding panel to the front viewing panel (where the observer places his eyes to see the stereogram) is approximately 5.5 inches. The trapezoidal aspect of the embodiment increases the structural stability of the stereoscope when assembled because the trapezoidal shape creates increased tension in the bracing side walls when the bracing side walls are secured to the front viewing panel. This tension drives each bracing side walls to bend in toward each other at a preformed diagonal crease without deforming other aspects of the stereoscope.

The bracing side walls of the stereoscope can have a range of heights, but the range of allowable dimensions are important in that the range of dimensions reduce or prevent shadows from forming on the stereogram and also give structural stability to the stereoscope. Preferably for viewing 4 by 6 inch stereograms, at a distance of between 28% to 34% of the height of the rear picture holding panel (approximately 1.12 inches (28.4 mm) to 1.36 inches (34.5 mm)), the height of each bracing side wall is between 28% to 34% of the height of the rear picture holding panel where the stereogram is placed. For a stereoscope for viewing 4 by 6 inch stereograms, if the height of each bracing side wall is less than 28% of the height of the picture holding panel, the bracing side wall tends to fall in and collapse, while if the height of each bracing side wall is greater than 34% of the height of the picture holding panel, then light entering from the sides of the stereoscope cast shadows on the stereogram.

At a distance of between 30% to 31% of the height of the rear picture holding panel (approximately 1.2 inches (30.5 mm) to 1.24 inches (31.5 mm) from the picture holding panel in an embodiment of a stereoscope for viewing a 4 by 6 inch stereograms), the height of each bracing side wall is between 30% and 31% of the height of the stereogram (1.2 to 1.24 inches).

In a preferred embodiment that provides structural support and prevents shadows on the stereogram, each bracing side wall has a height of approximately 1.25 inches (31.75 mm) at position that is 1.25 inches away from the picture holding panel when the stereoscope is in its assembled position.

In order to facilitate foldability of the stereoscope, each bracing side wall has a preformed (preferably scored) diagonal folding crease. Each diagonal folding crease has a first termination point starting from the corner intersecting the picture holding panel and bottom panel and a second termination point at the top edge of each bracing side wall at a predetermined distance away from the rear picture holding panel. As a consequence of the height of each bracing side wall being between 28% and 34% of the height of the rear picture holding panel, each diagonal folding crease is approximately between 1.58 (40.1 mm) to 1.92 inches (48.8 mm). Preferably, the length of each diagonal folding crease is approximately 1.75 inches (44.5 mm) (as a consequence of hypothetical right triangle with base and height of approximately 1.25 inches, where the top edge of each diagonal folding crease is 1.25 inches from the plane formed by the rear picture holding panel of the assembled stereoscope.

Each bracing side wall has a recess in close proximity to the front viewing panel when the stereoscope is in its assembled conformation. The front viewing panel has a left recess and a right recess. The recess on each bracing side wall is capable of engaging with one of the recesses on the front viewing panel to secure each bracing side wall to the front viewing panel. Bracing side walls may be secured to the front viewing panel by slats or inserts. The bracing side walls are secured to the rear picture holding panel through tape or other attachment device. When each bracing side wall is secured to the rear picture holding panel and to the front viewing panel, the stereoscope has the conformation of an open box-like structure.

The recesses on the bracing side walls are positioned such that the distance from the plane formed by the rear picture holding panel to the vertical plane formed by the recesses on each bracing side wall, is greater than the distance from the rear long edge of the bottom panel to the front short edge of the bottom panel. Preferably, if the length of the trapezoidal base is 5.5 inches, the diagonal length each bracing side wall is between 5.7 inches (144.8 mm) and 5.9 inches (149.9 mm) from the corner of the bracing side wall and picture holding panel to the recess on each bracing side wall. Since each bracing side wall at the position of the recesses is longer than the length of the trapezoidal bottom panel that integrally hinges the rear picture holding panel and the front viewing panel, each bracing side wall bends in order to accommodate the length difference (i.e. since each bracing side wall is longer than the bottom panel it is integrally hinged to, each bracing side wall must bend when the front viewing panel is engaged with each side bracing wall). This bend occurs at the preformed diagonal folding crease on each bracing side wall and drives each bracing side wall to bend in toward each other near the rear picture holding panel at the crease. This bend in the side bracing walls achieves the dual purpose of bracing the stereogram against the rear picture holding panel and stabilizing the stereoscope in its assembled conformation. Each bracing side wall can extend beyond the plane formed by the assembled front viewing panel, approximately 3.57 degrees from the perpendicular formed by the vertical plane of the front short edge of the bottom panel when the stereoscope is assembled. This assists with creating a bracing surface for the front viewing panel to engage when the front viewing panel is perpendicular to the bottom panel.

Each bracing side wall may have a middle section height that at least partly covers an ocular lens when the stereoscope is in its collapsed formation. Preferably, the height of this middle section is at least approximately 1.75 inches (44.5 mm). This height protects any pictures on the rear picture holding panel from coming into direct contact with the lenses on the front viewing panel when in its collapsed position, thereby protecting the pictures and the lenses from damage.

The front viewing panel has two apertures for the insertion of ocular lenses. The center of the lenses are preferably approximately 2.5 inches from the bottom panel of the assembled stereoscope. In the embodiment of a stereoscope for viewing 4 by 6 inch stereograms, each lens has a preferred focal distance of approximately 5.0 inches and the distance from rear picture holding panel to the front viewing panel is 5.5 inches. The shorter focal distance of the lens (5.0 inches) compared to the distance from the rear picture holding panel to the front viewing panel (5.5 inches) is to accommodate how the human eye focuses. In other embodiments of stereoscopes of different sizes, the focal lengths of the lenses are adjusted accordingly to have the observer view the stereogram in focus thereby providing comfortable full field of view of the respective image.

The stereoscope has a nasal space and septum panel formed from cut sections of the bottom panel and front viewing panel. The septum panel prevents cross-talk between left and right images of the stereogram by creating a barrier that prevents the left eye from seeing the right image of the stereogram and the right eye from seeing the left image of the stereogram. The nasal space preferably has a depth of approximately 1.5 inches from the front short edge of the bottom panel, and a width of approximately 1.625 inches in width centered on the bottom panel and front viewing panel to fit the nose of the observer. These dimensions allow an observer's eyes to be placed close to the lenses on the front viewing panel without the observer's nose pressing against the front viewing panel. By creating a nasal space with these dimensions, a septum panel forms a vertical barrier inside the structure when the stereoscope is assembled.

The septum panel has a preferable width of approximately 1.625 inches, and located approximately 1.5 inches from the plane formed by the assembled viewing panel. These dimensions prevent the left eye from viewing the right image of the stereogram, and the right eye from viewing the left image of the stereogram. The septum panel has a vertical height long enough to prevent both the left eye and the right eye from seeing over the septum panel and seeing the right image and left image respectively and in a preferred embodiment is approximately 3.25 inches in height.

In a preferred embodiment, the septum panel is integrally hinged to the bottom panel, and when the stereoscope is assembled, the septum panel is folded at the top portion along a preformed crease to form a nasal bridge integrally hinged to the viewing panel. When assembled, the front viewing panel and the septum panel are substantially parallel to each other, and the nasal bridge and bottom panel are substantially parallel to each other, and substantially perpendicular to the front viewing panel and septum panel.

FIGS. 1-8 are different views of a stereoscope in an unfolded, assembled, and collapsed configuration. In particular reference to the embodiment, FIG. 1 depicts an embodiment of an unfolded stereoscope 10 made of cardboard or other stiff but bendable material. The stereoscope 10 has front viewing panel 70 with apertures 64 for lenses 82. The front viewing panel 70 is integrally hinged to a bottom panel 72 and can be folded such that the front viewing panel 70 is substantially perpendicular to the bottom panel 72. Integrally hinged on the opposite side from the front viewing panel is a rear picture holding panel 12. The rear picture holding panel 12 preferably has a width of 6 inches at its base 22 and a height of 4 inches for its two legs 14, 16 so that the stereoscopic viewer 10 can hold a 4 by 6 inch stereogram. The rear picture holding panel 12 may be an LCD display.

Along the legs 74, 76 of the bottom panel 72 are two integrally hinged bracing side walls 42, 44 that can be folded such that they are substantially perpendicular to the bottom panel 72 when assembled. Each bracing side wall 42, 44, when assembled, is secured to the rear picture holding panel 12 by tape, glue, or other means of attaching the bracing side walls 42, 44 to the rear picture holding panel 12. Each bracing side wall 42, 44 has a diagonal folding crease 24, 26 that can be formed by scoring the bracing side walls 42, 44. Each diagonal folding crease 24, 26 may be 1.75 inches from each corner 20, 18 that connects the rear picture holding panel 12 to each bracing side wall 42, 44. The height of each diagonal folding crease 24, 26 from the base 74, 76 of each bracing wall 42, 44 is approximately 1.25 inches to the top edge 32, 34 of each bracing side wall 42, 44 and also approximately 1.25 inches from the base 22 of the rear picture holding panel 12, which is approximately 30%-31% percent of the height of the rear picture holding panel 12. The dimensions and position of each diagonal folding crease 24, 26 is optimal for reducing of shadows that may form on the stereogram due to light coming in from the sides of the bracing walls 42, 44. Each bracing wall 42, 44 may have a middle region 36, 38 of approximately at least 1.75 inches such that when the stereoscope 10 is in its collapsed configuration, the side walls 42, 44 at least partially cover the lenses 82 to protect the stereogram and the lenses 82.

Each bracing side wall 42, 44 has a recess 46, 48 that can engage with recesses 60, 62 on the viewing panel 70, when the stereoscope 10 is in the assembled position. The bracing side wall recesses 46, 48 are positioned in front of the plane formed from the viewing panel 70 in its assembled position. The front legs 50, 52 of the bracing side walls 42, 44 extend beyond the plane formed from the viewing panel 70 when the bracing side walls 42, 44 engage with the viewing panel 70. This causes a bend in the bracing side walls 42, 44 to occur at the preformed diagonal folding creases 24, 26 on each bracing side wall 42, 44. The diagonal folding creases 24, 26 causes the rear portion of the each bracing side wall 42, 44 bend slightly in toward each other and helps hold a stereogram against the rear picture holding panel 12. The bend also helps to brace the bracing side walls 42, 44 against the rear picture holding panel 12, and prevents the bracing side walls 42, 44 from falling in towards each other, which would block the observer from seeing the entirety of the stereogram.

The front viewing panel 70 can have a nasal space, so that the observer's eyes can be close to the lenses 82 without the observers nose interfering with placement of the eyes. The nasal space can be created by cutting the bottom panel 72 and front viewing panel 70 along side edges that then form a septum panel 68 that spans both the viewing panel 70 and bottom panel 72. The septum panel 68 is foldably hinged via a septum panel crease 40 to the bottom panel 72. The septum panel 68 is foldably hinged to a nasal bridge 66 via a septum-bridge crease 80, and the nasal bridge 66 is foldably hinged to the viewing panel 70 via a bridge-viewing panel crease 78.

The septum panel 68 and nasal space have a preferable width of 1.625 inches. The distance from the plane formed by the viewing panel 70 when assembled, is preferably 1.5 inches. These dimensions are optimal for preventing crosstalk of the left and right images placed on the rear panel 12. Using these dimensions, the left eye is substantially prevented from seeing the image on the right side of the rear picture holding panel 12 and the right eye is substantially prevented from seeing the image on the left side of the picture holding panel 12.

In a preferred embodiment, the angle formed by each leg 16, 14 of the rear picture holding panel 12 and the long leg 28, 30 of each bracing wall 42, 44 is an obtuse angle of about 91.79 degrees. The angle formed by the long leg 28, 30 of each bracing wall 42, 44 and each diagonal folding crease 24, 26 may be 46 degrees, and the angle formed by the base 74, 76 of each bracing wall 42, 44 to the diagonal folding crease 24, 26 is approximately 44 degrees. The angle formed from plane of the base 58 of the viewing panel 70 and each recess 46, 48 on each of the bracing walls 42, 44 is 3.57 degrees. In a preferred embodiment, the diagonal length of each bracing side wall 42, 44 from the corner formed from the rear legs 28, 30 and picture holding panel 12 to each recess 46, 48 is approximately 5.7 to 5.9 inches. In a preferred embodiment, the shape of the bottom panel 72 is an isosceles trapezoid, with a portion of the small base cut or sliced to form a septum panel 68.

Figure 2:
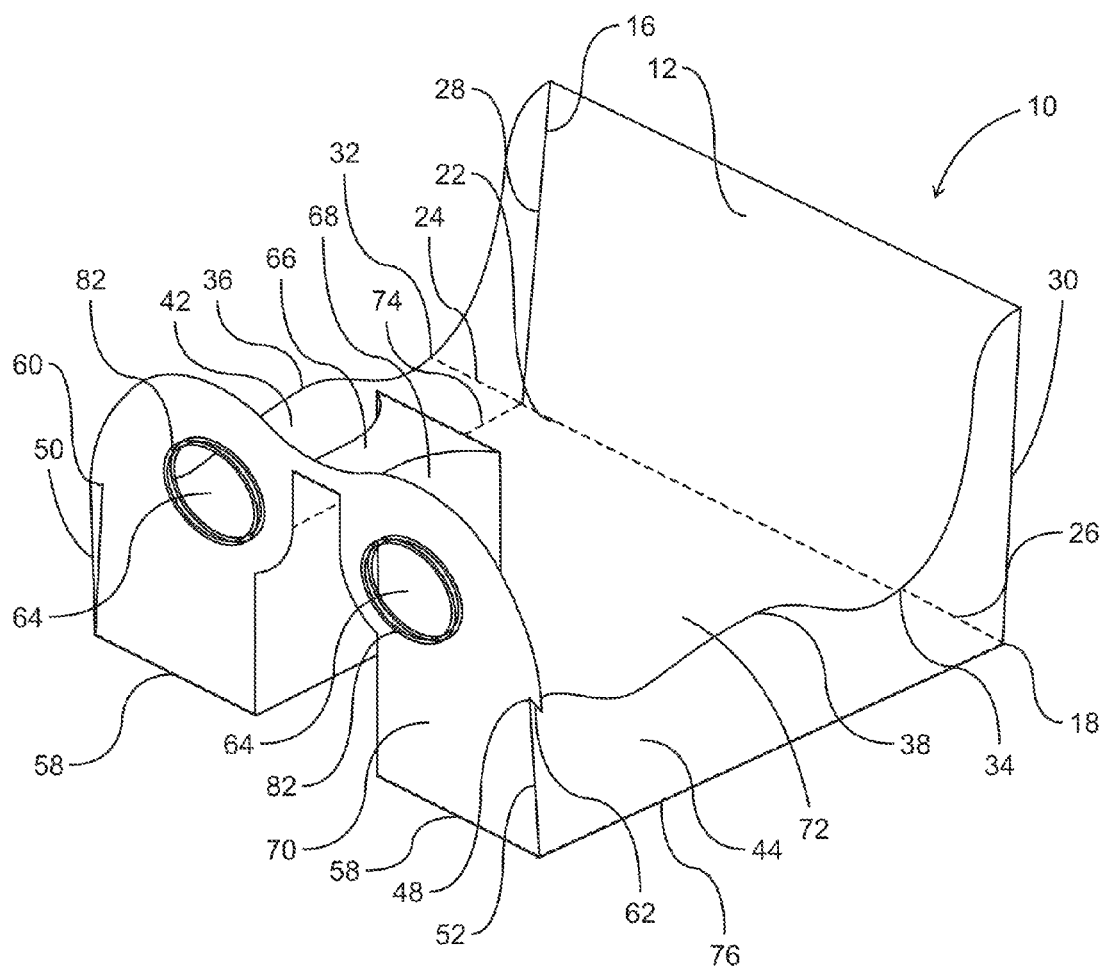
FIG. 2 is front perspective view of an assembled stereoscope.
Figure 3:
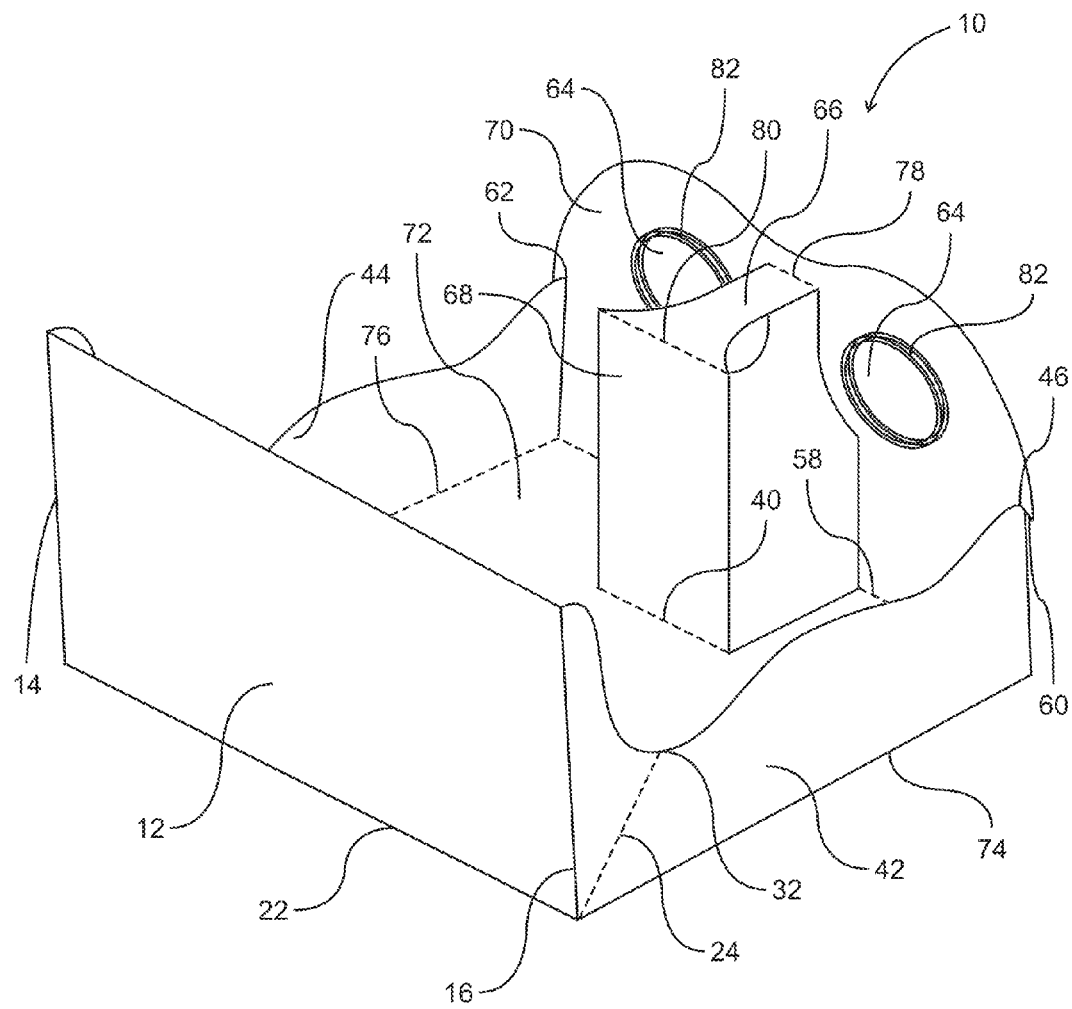
FIG. 3 is a rear perspective view of an assembled stereoscope.

With particular reference to FIG. 2 and FIG. 3, these figures depict different views of an embodiment of the stereoscope 10 in its assembled configuration. FIG. 2 depicts an assembled embodiment from a front top perspective while FIG. 3 depicts an assembled embodiment from a rear top perspective. The bracing side walls 42, 44 are foldably hinged substantially perpendicular to the bottom panel 72, and fold up such that the legs 14, 16 of the rear picture holding panel 12 are adjacent to the legs 28, 30 of the bracing side walls 42, 44, which secured together by tape or other attachment mechanism. The front viewing panel 70 is substantially perpendicular to the bottom panel 72, and bracing side walls 42, 44. The viewing panel 70 is substantially parallel to the rear picture holding panel 12 and septum panel 68. The front viewing panel 70, is engaged with each bracing side wall 42, 44 via recesses 46, 48 on the front viewing panel 70 with recesses 60, 62 on the bracing side walls 42, 44. The diagonal folding creases 24, 26 on the bracing side walls 42, 44 allow the bracing side walls 42, 44 to bend in toward each other and support the stereogram against the rear picture holding panel 12, and supplies tension against the front viewing panel 70 to keep the final assembly together when the recesses 42, 44, 60, 62 are engaged.

The distance from each rear vertical bracing side wall leg 28, 30 to the recesses 46, 48 on each bracing side wall 42, 44 is greater than the length of the bottom panel side legs 74, 76, causing the bracing side walls 42, 44 to angle and bend in toward each other at the diagonal folding creases 24, 26. When the height from the base of each of the bracing side walls 74, 76 to the termination point on the bracing side walls 32, 34 of the diagonal folding crease 24, 26 is 28% to 34% of the height of the rear picture holding panel 12 (approximately 1.12 to 1.36 inches when the rear picture holding panel 12 has a height of 4 inches), the stereoscope 10 is structurally stable by the bracing side walls 42, 44, which do not fall in toward each other at this height, but also reduce or prevent shadowing on the stereogram, which is placed on the rear picture holding panel 12.

Figure 4:
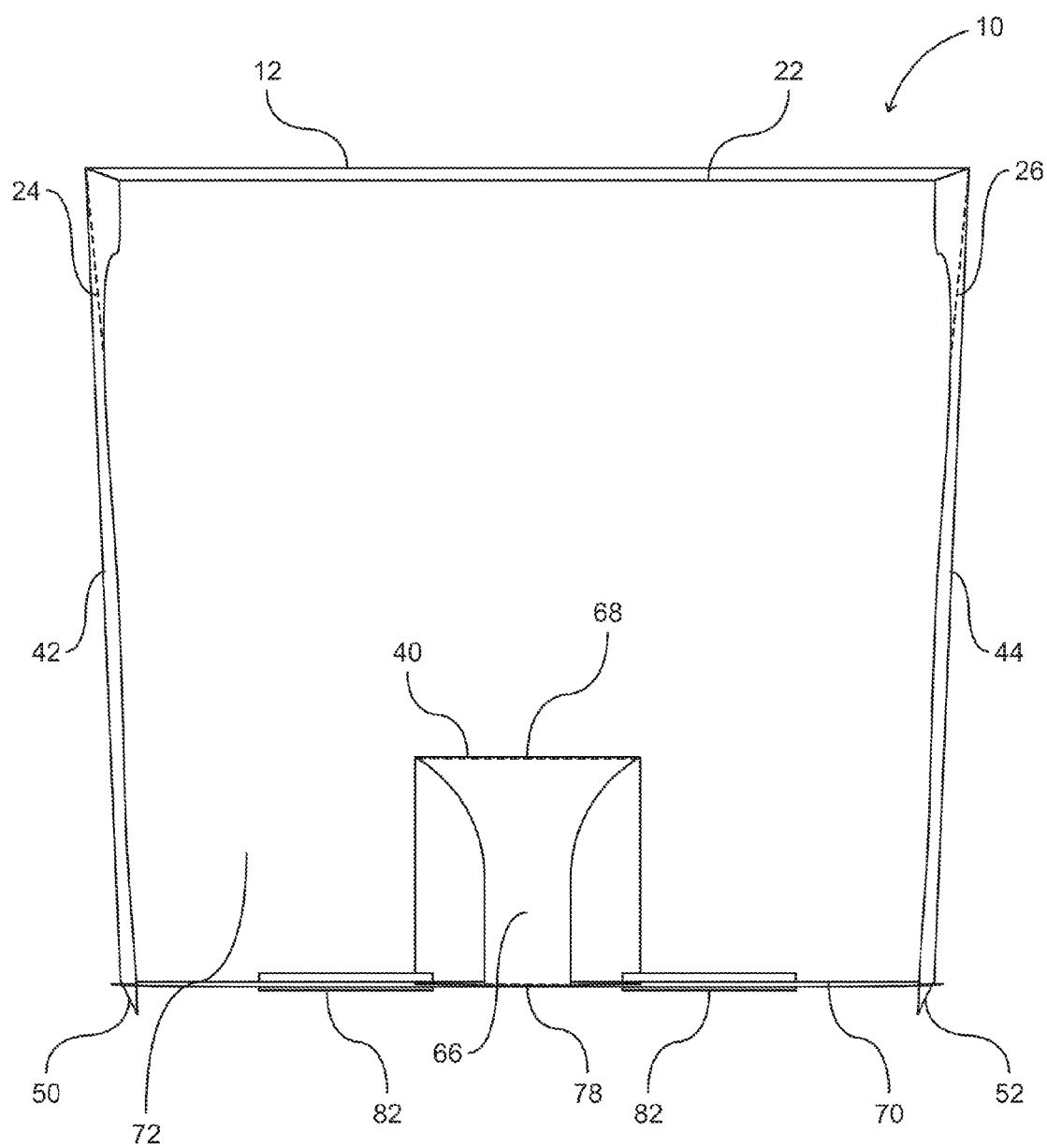
FIG. 4 is top view of an assembled stereoscope.

With particular reference to FIG. 4, this figure depicts an embodiment of the stereoscope 10 from a top view in its assembled configuration. Notably, the bottom panel 72 is trapezoidal in shape and depicts each bracing side wall 42, 44, angling in toward each at the preformed diagonal folding creases 24, 26.

Figure 5:
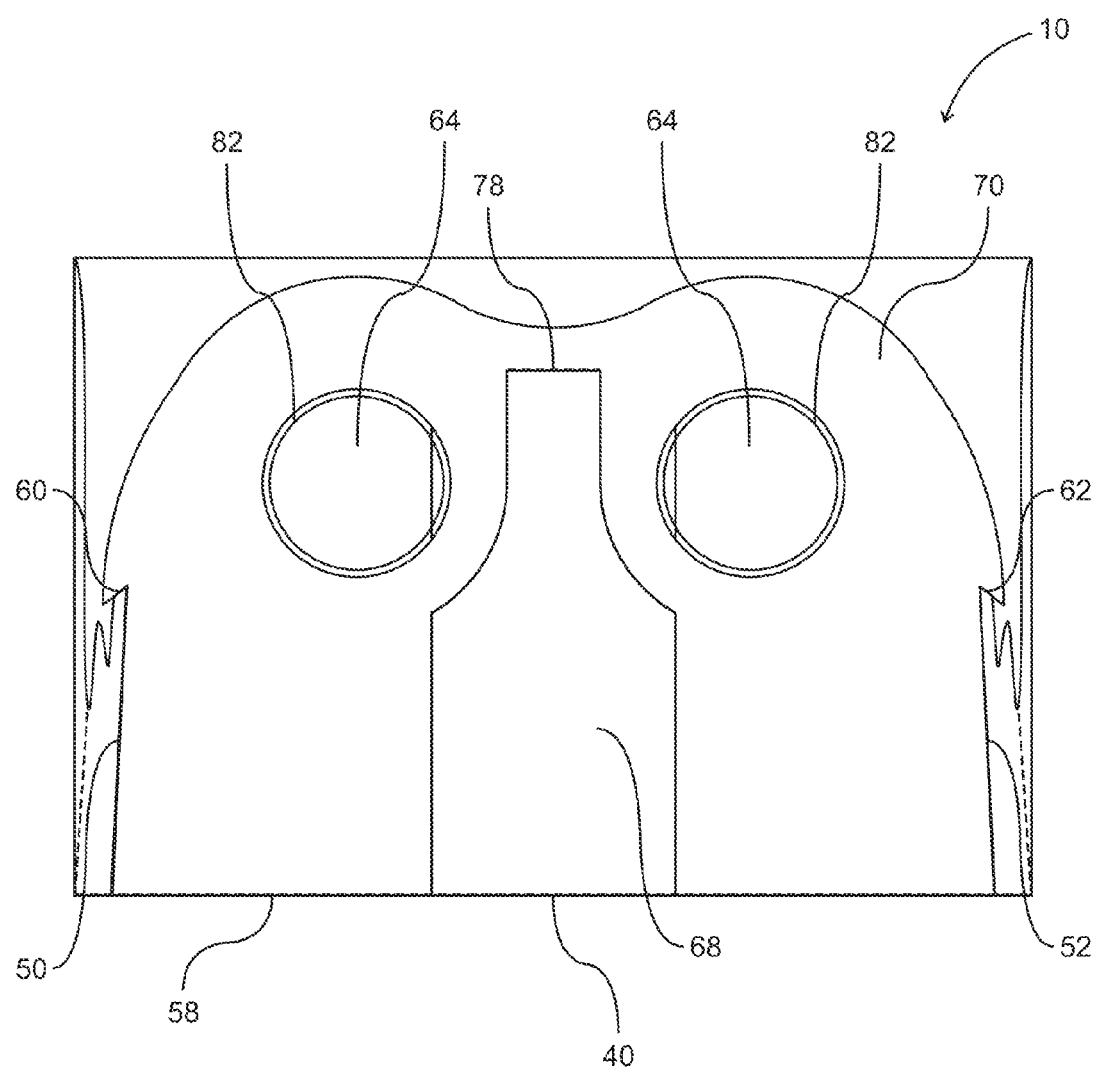
FIG. 5 is front view of an assembled stereoscope.

With particular reference to FIG. 5, this figure depicts an embodiment of the stereoscope 10 from the front view. An observer views the stereogram through lenses 82 within the front viewing panel 70. The observer's nose is placed in cut out area in the front viewing panel 70 which forms the septum panel 68 when the stereoscope 10 is in its assembled configuration.

Figure 6:
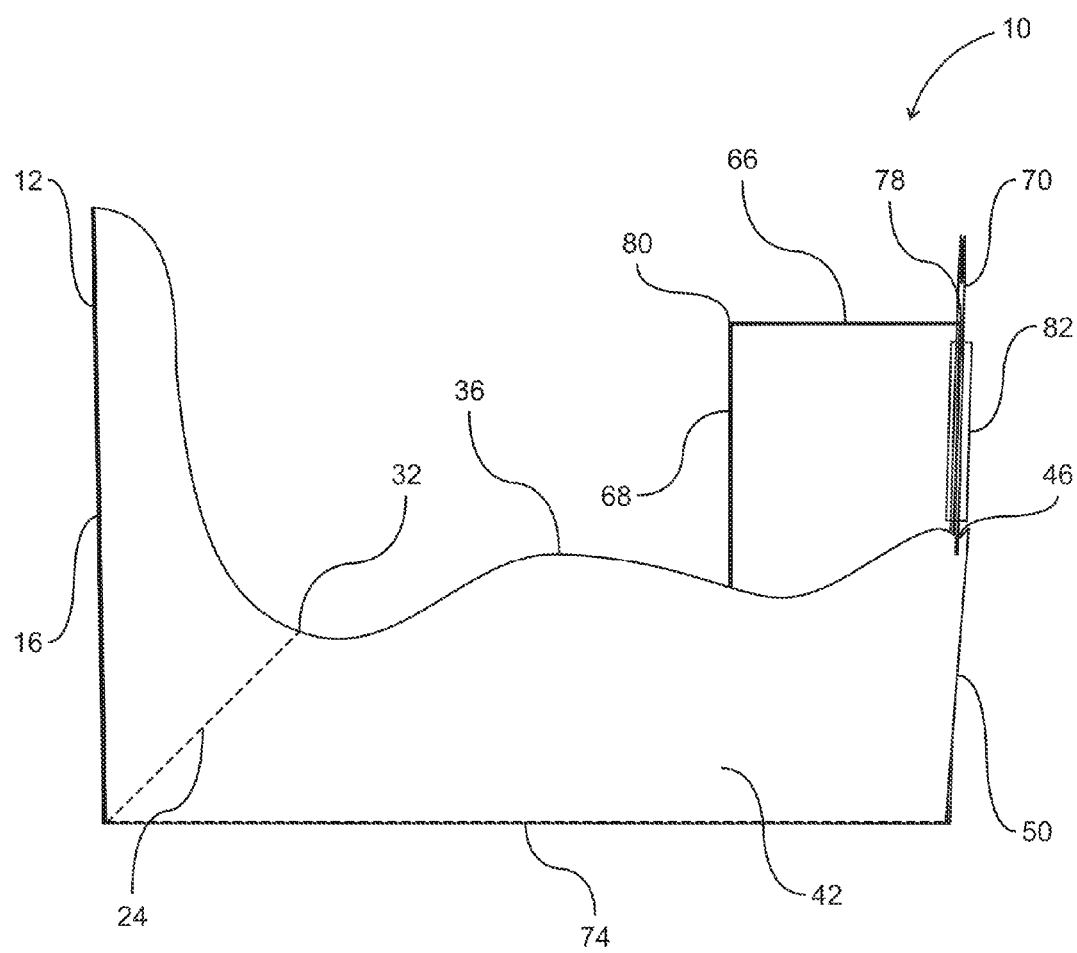
FIG. 6 is a side plan view of an assembled stereoscope.

With particular reference to FIG. 6, this figure depicts an embodiment of a stereoscope 10 from a side view in its assembled conformation. Notably, the distance from the base 74 of the bracing side wall 42 to the top edge 32 of the bracing side where the folding crease 24 terminates is approximately 1.25 inches. Preferably, the distance from the plane of the assembled rear picture holding panel 12 to the vertical plane of the recess 46 on the bracing side wall 42 is greater than the length of the base 74 of bracing side wall 42. When the front viewing panel 70 is engaged with the recess 46 on the bracing side wall 42, it will cause the bracing side wall 42 to bend in at the preformed folding crease 24 to accommodate the difference in lengths. The bend both acts as a brace for a picture against the rear picture holding panel 12, as well increases structural stability of the assembled stereoscope 10.

Figure 7:
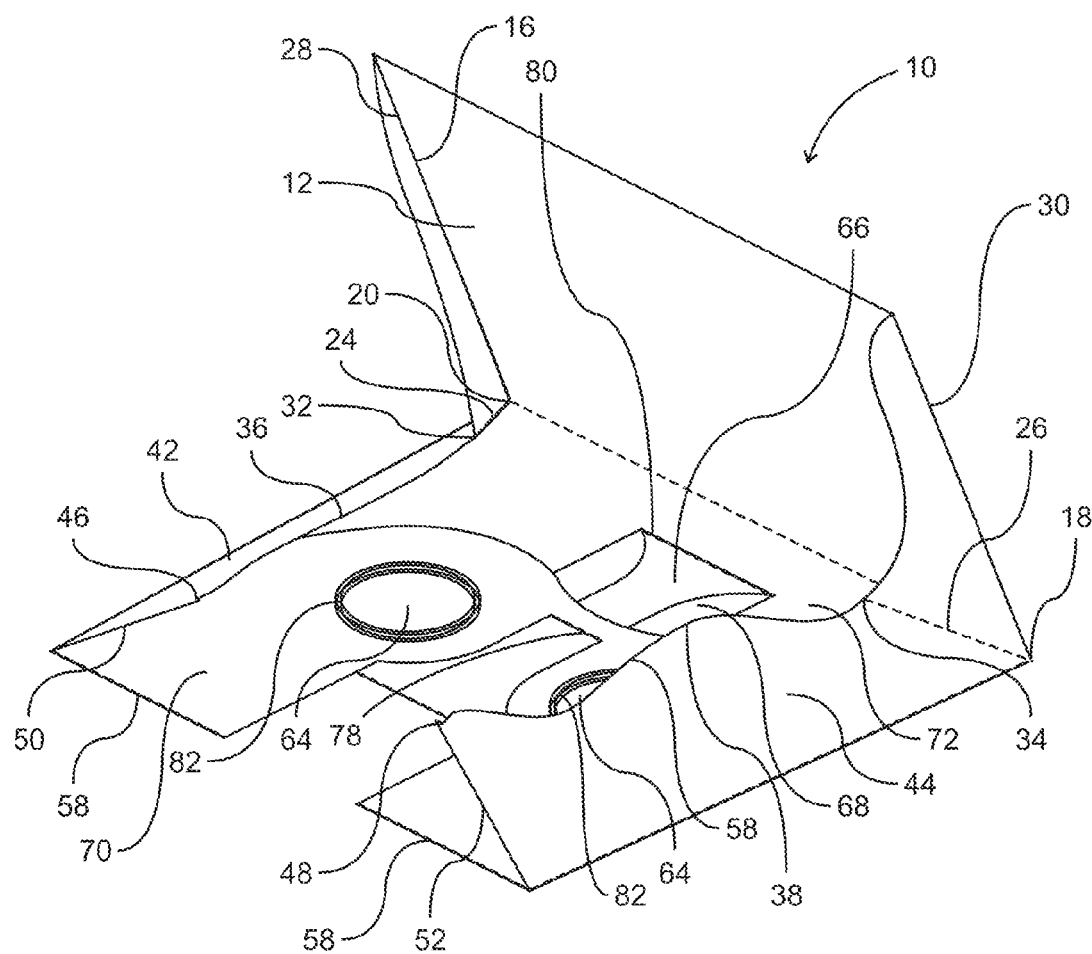
FIG. 7 is a perspective view of a partially collapsed stereoscope.
Figure 8:
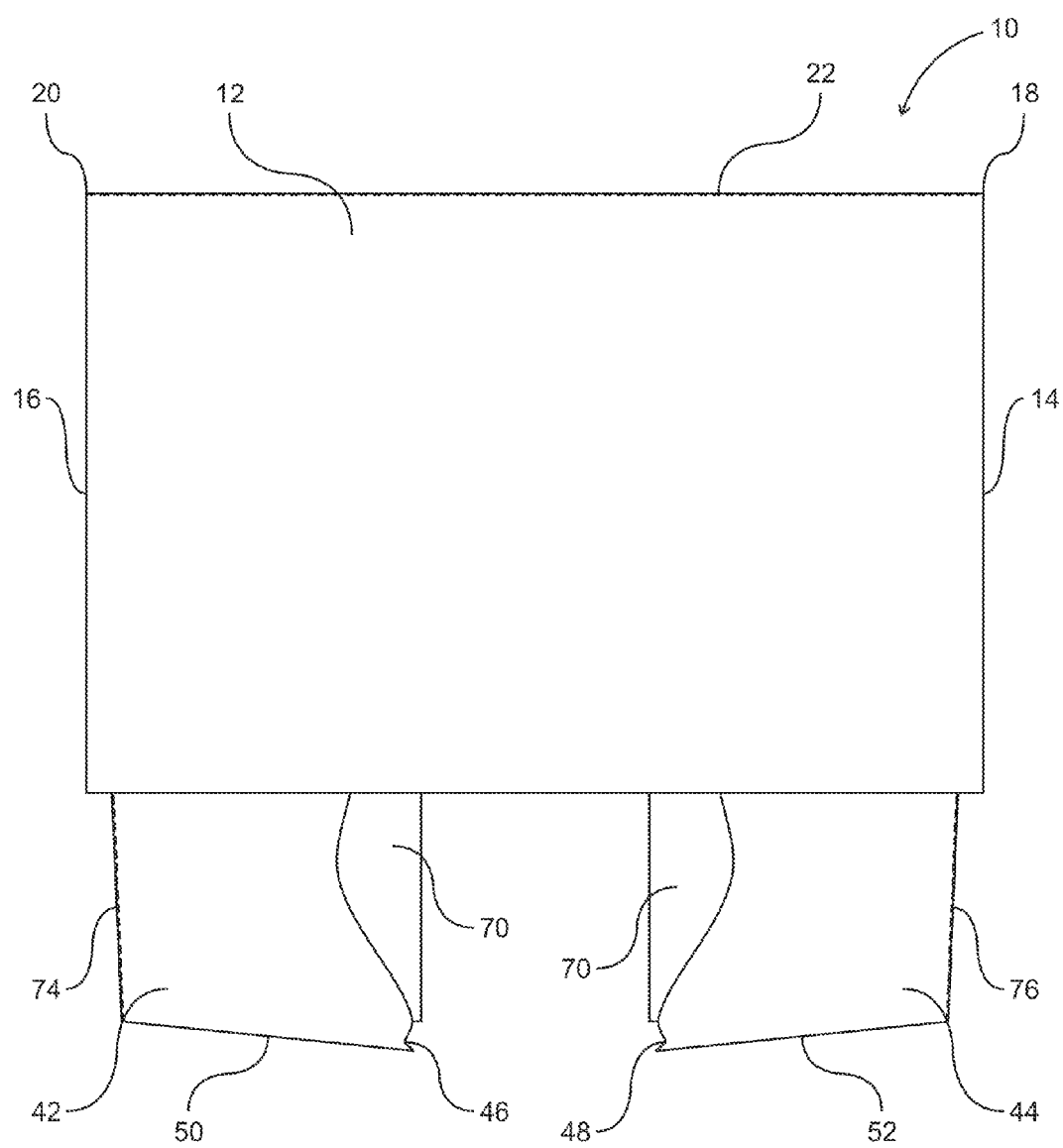
FIG. 8 is a top view of a collapsed stereoscope.

With particular reference to FIG. 7 and FIG. 8, these figures depict perspective views of a partially folded stereoscope 10, and top view of a completed folded stereoscope 10, respectively. The front viewing panel 70 is disengaged from the bracing side walls 42, 44 at the recesses 46, 48. The front viewing panel 70 is folded down such that it lays flat against the bottom panel 72. The septum panel 68 and nasal bridge 66 are also folded down onto the bottom panel 72. Each bracing side wall 42, 44 is folded in toward each other, through the diagonal folding creases 24, 26 causing the section of bracing side walls 42, 44 nearer the front viewing panel 70 to lay flat on top of the front viewing panel 70. A middle section 36, 38 of each bracing side wall 42, 44 covers at least a portion of the apertures 64 for lenses 82. The rear picture holding panel 12 folds down on top of the bracing side walls 42, 44, forming a flattened stereoscope 10, which may be useful for sending through the mail.

FIG. 8 depicts an embodiment of the stereoscope 10 in its collapsed configuration. To achieve this folded down configuration, the front viewing panel 70 is folded down on top of the bottom panel 72. The bracing walls 42, 44 are folded in and down onto the front viewing panel 70. The picture holding panel 12 is then folded on top of the folded bracing side walls 42, 44 to form a flat collapsed stereoscope 10.

I claim:

1. A collapsible stereoscopic viewer having an open top, comprising:
   a base panel, said base panel having a rear edge, a first-side edge, a second-side edge, and a front edge;
   a rear panel for placement of at least one stereogram, said rear panel connected to said base panel along said rear edge, said rear panel having a height;
   a first side wall, said first side wall connected to said base panel along said first-side edge and connected to said rear panel, said first side wall having a first diagonal folding crease extending from a corner where said first side wall connects with said rear panel and said base panel, said first side wall having a top edge and said first diagonal folding crease terminating at the top edge of the first side wall at a termination point;

a second side wall, said second side wall connected to said base panel along said second-side edge and connected to said rear panel, said second side wall having a second diagonal folding crease extending from a corner where said second side wall connects with said rear panel and said base panel, said second side wall having a top edge and said second diagonal folding crease terminating at the top edge of the second side wall at a termination point;

wherein each of the first and second side walls has a plurality of different heights along their respective top edges;

wherein each of the termination points of the first and second diagonal folding creases is positioned at a height of between 28% to 34% of the height of the rear panel when the collapsible stereoscopic viewer is in an assembled configuration;

wherein each of the termination points of the first and second diagonal folding creases is positioned horizontally away from the rear panel at a distance of between 28% to 34% of the height of the rear panel when the collapsible stereoscopic viewer is in the assembled configuration;

a front view panel connected to said base panel along said front edge, said front view panel detachably connected to said first side wall and said second side wall, said front view panel having two ocular lenses for viewing said at least one stereogram;

wherein said stereoscopic viewer can be collapsed by detaching said front view panel from said first side wall and said second side wall, folding said front wall along said front edge so that said front view panel collapses against said base panel, folding said first side wall along said first diagonal folding crease so that said first side wall collapses over said front view panel, folding said second side wall along said second diagonal folding crease so that said second side wall collapses over said front view panel, and folding said rear panel along said rear edge so that said rear panel collapses over said first side wall and said second side wall;

wherein said rear edge of said base panel is longer than said front edge of said base panel, thereby causing said first side wall and said second side wall to bend inward relative to each other in order to hold said at least one stereogram against said rear panel when said stereoscopic viewer is in its assembled configuration.

2. The stereoscopic viewer of claim 1, wherein said stereoscopic viewer is capable of playing music.

3. The stereoscopic viewer of claim 1, wherein said picture holding panel is an LCD display.

4. The stereoscopic viewer of claim 1, wherein at a distance from said rear long edge of bottom panel of between 30% to 31% of the height of said rear picture holding panel, each of said first and second bracing side walls have a height of between 30% and 31% of the height of said rear picture holding panel.

5. The stereoscopic viewer of claim 1, wherein at a distance from said rear long edge of bottom panel of approximately 1.25 inches, each of said first and second bracing side walls has a height of approximately 1.25 inches.

6. The stereoscopic viewer of claim 1, wherein said first bracing side wall is detachably secured to said front viewing panel via a first recess on said first bracing side wall, and said second bracing side wall is detachably secured to said front viewing panel via a second recess on said second bracing side wall.

7. The stereoscopic viewer of claim 1, further comprising:

said first side wall having a first portion that is connected to said rear panel and a second portion that is connected to said base panel, said first portion and said second portion demarcated by said first diagonal folding crease;

said second side wall having a first portion that is connected to said rear panel and a second portion that is connected to said base panel, said first portion and said second portion demarcated by said second diagonal folding crease;

wherein said respective first portions fold over said respective second portions along said respective diagonal folding creases when said stereoscopic viewer is collapsed.

8. The stereoscopic viewer of claim 1, wherein said first side wall having a first portion that is connected to said rear panel and a second portion that is connected to said base panel, said first portion and said second portion demarcated by said first diagonal folding crease, and wherein said first portion of the first side wall has a height greater than a height of said second portion of the first side wall;

said second side wall having a first portion that is connected to said rear panel and a second portion that is connected to said base panel, said first portion and said second portion demarcated by said second diagonal folding crease, and wherein said first portion of the second side wall has a height greater than a height of said second portion of the second side wall;

wherein said stereoscopic viewer can be collapsed by detaching said front view panel from said first side wall and said second side wall, folding said front view panel along said front edge so that said front view panel collapses against said base panel, folding said first side wall along said first diagonal folding crease so that said first portion folds over said second portion along said first diagonal folding crease, folding said second side wall along said second diagonal folding crease so that said first portion folds over said second portion along said second diagonal folding crease, and folding said rear panel along said rear edge so that said rear panel collapses over said first side wall and said second side wall.

9. The stereoscopic viewer of claim 8, wherein said front viewing panel further comprises a nasal space and a septum panel, whereby said septum panel prevents crosstalk of a left and a right image on said stereogram.

10. The stereoscopic viewer of claim 9, wherein said septum panel has a width of approximately 1.625 inches and a depth of approximately 1.5 inches away from a vertical plane formed by said front viewing panel when said stereoscope is in its assembled conformation.

11. The stereoscopic viewer of claim 8, wherein said bottom panel is trapezoidal and integrally hinged to said rear picture holding panel, said first and second bracing side walls, and said front viewing panel.

12. The stereoscopic viewer of claim 8, wherein a middle portion of each of said first and second bracing side walls are approximately 1.75 inches in height, thereby covering at least partially, said ocular lenses, protecting said stereogram and said lenses from coming into direct contact with each other when said stereogram is in its collapsed conformation.

13. The stereoscopic viewer of claim 1, wherein
an angle of approximately 44 degrees is formed between the first diagonal crease and a base of the first side wall, and an angle of approximately 44 degrees is formed between the second diagonal folding crease and a base of the second side wall.

14. The stereoscopic viewer of claim 8, wherein said lenses each have a focal distance of approximately 5.0 inches.

15. The stereoscopic viewer of claim 8, wherein said front viewing panel has a plurality of recesses, whereby said plurality of recesses detachably secure said first and second recesses on said bracing side walls when said stereoscopic is in its assembled conformation.

16. The stereoscopic viewer of claim 8, wherein said stereoscope is made from a single piece of stiff but flexible material.

\* \* \* \* \*